Aug. 26, 1930.  A. C. HOUGLAND ET AL  1,774,327
CHURN DRIVE
Filed April 8, 1927   2 Sheets-Sheet 1

Inventor
Axel B. Carlson
Albert C. Hougland
By
Attorney

Aug. 26, 1930. A. C. HOUGLAND ET AL 1,774,327
CHURN DRIVE
Filed April 8, 1927   2 Sheets-Sheet 2
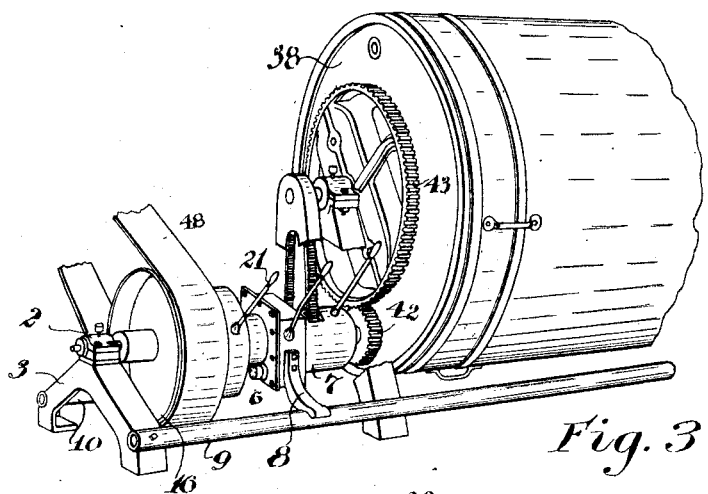
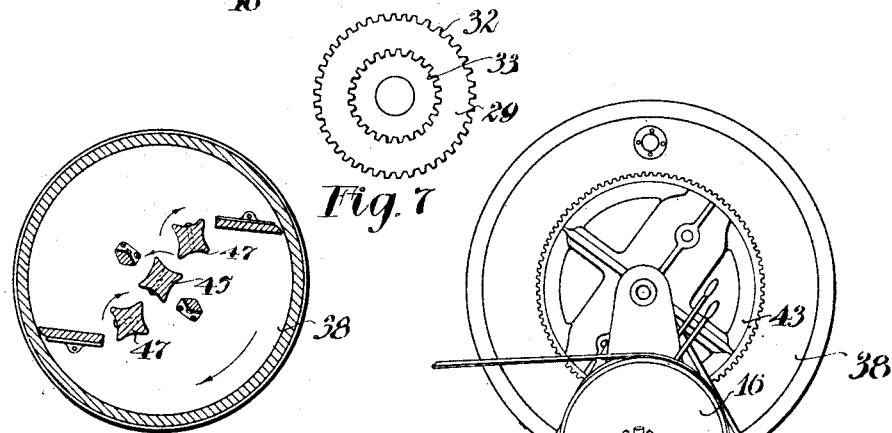
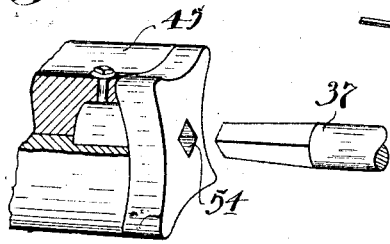
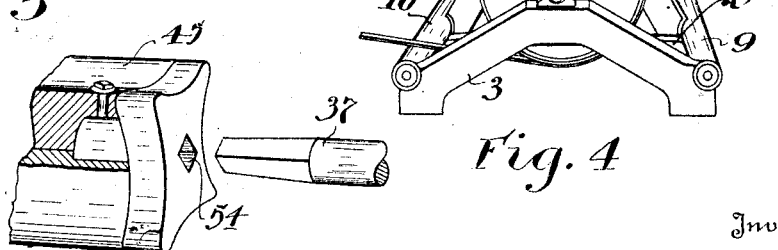
Inventor
Axel B. Carlson
Albert C. Hougland
Attorney Patented Aug. 26, 1930

1,774,327

UNITED STATES PATENT OFFICE

ALBERT C. HOUGLAND AND AXEL B. CARLSON, OF ST. PAUL, MINNESOTA, ASSIGNORS TO CRANE COMPANY OF MINNESOTA, OF ST. PAUL, MINNESOTA, A CORPORATION OF MINNESOTA

CHURN DRIVE

Application filed April 8, 1927. Serial No. 182,040.

The present invention relates to a churn drive mechanism.

In the operation of butter churns it is desirable to drive the churn at comparatively high speed during the initial period of a churning operation and at a slower speed during the fininshing part of said churning operation, and to have means operable within the churn for working the butter formed by the churning operation.

An object of the present invention is to simplify and improve a drive mechanism for a dairy churn.

In order to attain this object, there is provided, in accordance with one feature of the invention, a churn drive mechanism having change speed mechanism incorporated therein, and having releasable drive means cooperable therewith to drive butter working mechanism associated with said churn.

These and other features of the invention will be more fully brought out in the following description and the accompanying drawings, wherein:

Figure 3, is a view in perspective of an end of a churn equipped with the drive mechanism embodied in the present invention.

Figure 4, is a view in end elevation of the mechanism shown in Figure 3.

Figure 5, is a view in transverse section through a churn.

Figure 6, is a view in end elevation of a butter working element embodied in said churn; and Figure 7, is a view in side elevation of an internally and externally toothed gear used in the drive mechanism.

Figure 1:
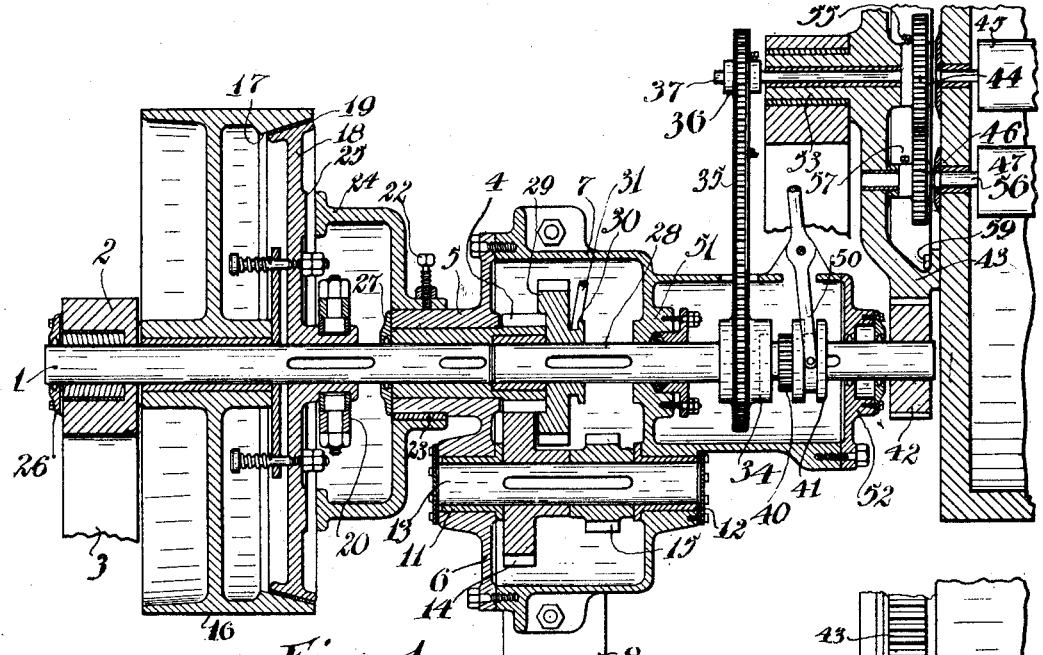
Figure 1 is a view in longitudinal section through a churn drive mechanism made in accordance with the present invention, showing a portion of the churn in conjunction therewith.
Figure 2:
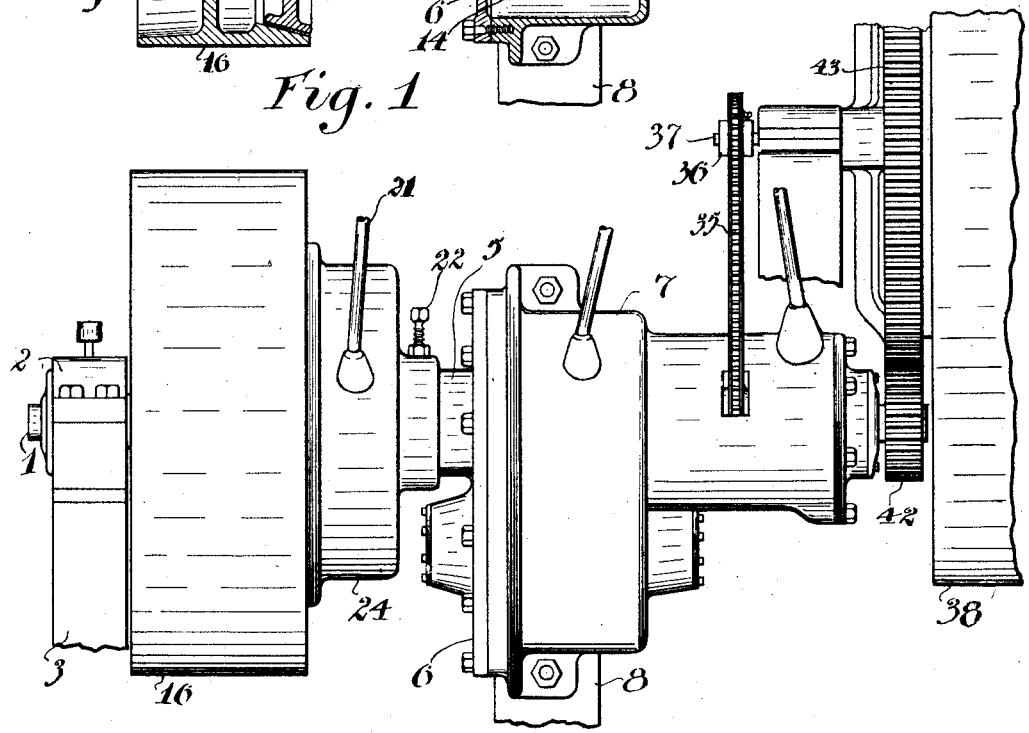
Figure 2, is a view in side elevation of the mechanism shown in Figure 1.

Referring to the drawings in detail, a shaft 1 has one end thereof rotatably mounted in a bearing 2 supported in an end frame member 3. The other end of the shaft 1 is keyed to a gear 4 which is in turn rotatably mounted in a bearing 5. The bearing 5 is integral with an end plate 6 of a housing 7 which is carried by a second support member 8 permanently mounted upon longitudinal frame members 9 and 10. The end plate member 6 has a bearing 11 therein in which, and in a bearing 12 in the housing 7, is rotatably mounted a countershaft 13 upon which are keyed gears 14 and 15. Mounted upon the shaft 1 to be freely rotatable thereon is a pulley 16 having a clutch face 17 interiorly of one side thereof. Keyed to the shaft 1 is a clutch member 18 having a clutch facing 19 secured thereto to engage the clutch surface 17 interiorly of the pulley 16. The clutch member 18 is slidably mounted upon the shaft 1 and is movable longitudinally thereof by means of a shifting fork 20 having a lever 21 connected thereto. Mounted upon the bearing support 5 of the end plate member 6 by means of a set screw 22 and a key 23 is a brake collar 24 which engages a braking surface 25 upon the clutch 18 when the clutch is moved to released position by the throw-out fork 20.

A packing ring 26 is mounted over the bearing 2 and a second packing ring 27 is mounted over the end of the bearing 5 in which the gear 4 is mounted to prevent the seepage of oil from these bearings. A shaft 28 is rotatably supported within the end of the gear 4 and in bearings 51 and 52 of the housing 7. Slidably mounted upon the shaft 28 and keyed to said shaft is a change speed gear 29 having a flange 30 integral therewith within which rides a shifting fork 31 by means of which the gear may be slidably moved upon the shaft 28. The gear 29 has external teeth 32 and internal teeth 33, the external teeth being designed to engage the teeth of the gear 15 keyed to the counter shaft 13, and the internal teeth being adapted to receive the end of the gear 4 therein. The gear 4 is constantly in mesh with the gear 14 which is keyed to the counter shaft 13.

A sprocket 34 is mounted upon the shaft 28 to be freely rotatable thereon, and a drive chain 35 passes around said sprocket and around a second sprocket 36 keyed to a shaft 37 which is rotatably supported within the hub 53 (see Figure 1) of the gear 43 and through the end of the churn cylinder. The end of the shaft 37 is squared and tapered, as shown in Figure 6, and is inserted in a square opening 54 in the end of a butter working member 45. A gear 44 is secured to the shaft 37 by means of a set screw 55. Should the butter working member 47 become loosened upon the shaft 37 through wear or other cause, it may be tightened by releasing the set screw 55 forcing the shaft 37 inward so as to move the squared, tapered end of the shaft 37 into the square opening 54, and again tightening the set screw 55. Having toothed engagement with the gear 44 are two other gears 46 on either side thereof, each of said gears being connected to shafts 56 by means of set screws 57. The ends of the shafts 56 are squared and tapered in the same manner as the shaft 37, the ends of these shafts being inserted in square openings in the ends of butter working members 47 in the same manner as that described for the shaft 37 and the butter working member 45.

A gear 40 is slidably mounted upon the shaft 28 and is keyed to said shaft to rotate therewith. The gear 40 is provided with a flanged groove 41 in which rides a shifting fork 50 by means of which the gear 40 may be slidably moved upon the shaft 28. One side of the sprocket 34 is toothed internally to receive the teeth of the gear 40 so that by slidably moving the gear 40 upon the shaft 28, the teeth of said gear may be brought into meshed engagement with the internally toothed portion of the sprocket 34 to cause it to rotate therewith. A spur gear 42 is keyed to the end of the shaft 28 to rotate therewith and is in toothed engagement with a large gear 43 permanently secured to the end of a churn cylinder 38, as by bolts 59.

In operating the mechanism, the pulley 16 is rotated during a churning operation by means of a belt 48, or other suitable drive means, connected to a suitable source of motive power, not shown. To retain the churn cylinder 38 in a required position, the clutch 18 is moved to the right from the position shown in Figure 1 to release the clutch from engagement with the clutch surface 17 of the pulley 16 and to bring the braking surface 25 against the collar 24. This locks the shaft 1 against rotation and in turn also locks the shafts 13 and 28 against rotation which holds the churn cylinder 38 firmly in a required position.

A supply of cream is then placed in the churn cylinder and the gear 29 is moved to the left hand position, as shown in Figure 1, by means of the shifting fork 31. This causes the internal teeth 33 of the gear 29 to enmesh the teeth of the gear 4 and thus provides a direct drive from the shaft 1 to the shaft 28 and thence to the spur gear 42. The butter working mechanism, comprised in the members 45 and 47, is disconnected from driving engagement with the shaft 28 by moving the gear 40 out of engagement with the internally toothed portion of the sprocket 34. The clutch 18 may then be moved to the left by means of the shifting fork 20 to bring the clutch facing 19 into engagement with the face 7 of the pulley 16, causing the clutch 18 and the shaft 1 to rotate. The direct drive from the pulley 16 to the spur gear 42 will drive the churn cylinder 38 at a comparatively high speed which is desirable during the first stage of a butter churning operation. The butter working elements 45 and 47 will be idle during this phase of the operation, since the sprocket 34 is out of driving engagement with the gear 40. Upon the completion of the first stage of the churning operation, the clutch 18 is released from the pulley 16 and the braking surface 25 is brought against the collar 24 to stop the churn and hold it against rotation. The gear 29 is then moved to the right from the position shown in Figure 1, out of engagement with the gear 4, and into engagement with the gear 15 keyed to the shaft 13. The gear 4 is in constant driving engagement with the gear 14, which is keyed to the same shaft as the gear 15, said gear 15 being in turn in mesh with the gear 29. The gear 4 being smaller than the gear 14 and the gear 15 being smaller than the gear 29, will cause a reduction of speed from the shaft 1 to the shaft 28 to which the spur gear 42 is keyed. At this time, the gear 40 is moved into meshed engagement with the internally toothed portion of the sprocket 34, causing the sprocket 36 to rotate the shaft 37, which, through the gears 44 and 46, will rotate the butter working elements 45 and 47 in the directions indicated by the arrows in Figure 5. The clutch 25 is then brought into engagement with the pulley 16 and the parts are driven as above described, until the churning operation is completed. Upon completion of the churning operation with the gears in this position, the clutch may be thrown out and the churn held in a required position by means of the braking surface 25 held in engagement with the braking surface of the collar 24.

The mechanism thus provided combines the necessary elements for driving the butter working mechanism, and, at the same time, provides means for holding the churn in required position without the need for various ratchets and other locking means required by present churn drive mechanism, and also provides a simple and efficient change speed gear for driving the churn at different stages of a butter making operation.

We claim:

A churn drive mechanism comprising a housing, a casing formed on said housing and extending outwardly therefrom, a rotatable shaft having one end supported in said housing and provided with a fixed gear, a second shaft extending through said casing and into said housing and having its inner end rotatably supported within said gear, a second gear slidably mounted on the last named shaft to releasably engage the first named gear, a countershaft rotatably supported in said housing having a plurality of gears thereon, one of said gears being in driving engagement with the first named gear, and the other of said gears having releasable engagement with the slidable gear, a pulley freely rotatable on the first named shaft, a brake drum formed on the housing opposite the casing, clutch mechanism interposed between the pulley and brake drum and being movable in one direction to engage the pulley to drive the first named shaft and in another direction to engage the brake drum to stop said shaft, and drive mechanism releasably carried by the second shaft within the casing and having operative engagement with an independently rotatable element of said churn to actuate the latter.

In testimony whereof we affix our signatures.

ALBERT C. HOUGLAND.
AXEL B. CARLSON.